United States Patent [19]
Rutkowski et al.

[11] Patent Number: 5,390,389
[45] Date of Patent: Feb. 21, 1995

[54] WHEELED LOAD CARRIER

[75] Inventors: Michael J. Rutkowski; Kevin D. Kostalnick, both of Brunswick, Ohio

[73] Assignee: Emerson Electric Company, St. Louis, Mo.

[21] Appl. No.: 242,964

[22] Filed: May 16, 1994

[51] Int. Cl.⁶ .......................... B08B 9/02; B62B 5/02
[52] U.S. Cl. ........................ 15/104.33; 280/5.22; 280/5.32
[58] Field of Search ............. 15/104.33; 280/5.2, 280/5.22, 5.24, 5.28, 5.32, 47.2

[56] References Cited

U.S. PATENT DOCUMENTS

| | | | |
|---|---|---|---|
| 1,255,484 | 2/1918 | Stephens . | |
| 1,807,913 | 6/1931 | Hollowood | 280/47.2 |
| 2,193,283 | 3/1940 | Harberson | 280/5.22 |
| 2,715,533 | 8/1955 | Strausburg | 280/5.22 |
| 3,007,186 | 11/1961 | Olsson | 15/104.33 |
| 3,246,354 | 4/1966 | Cooney et al. | 15/104.33 |
| 3,747,153 | 7/1973 | O'Neill | 15/104.33 |
| 3,942,217 | 3/1976 | Bates | 15/321 |
| 4,047,724 | 9/1977 | Shaffer | 280/47.2 |
| 4,130,291 | 12/1978 | Saethre et al. | 280/5.22 |
| 4,364,139 | 12/1982 | Babb et al. | 15/104.33 |
| 4,632,627 | 12/1986 | Swallows | 414/490 |
| 4,681,330 | 7/1987 | Misawa | 280/47.2 |
| 5,031,276 | 7/1991 | Babb et al. | 15/104.33 |
| 5,087,013 | 2/1992 | Gress et al. | 248/676 |
| 5,309,595 | 5/1994 | Salecker | 15/104.33 |

FOREIGN PATENT DOCUMENTS

| | | | |
|---|---|---|---|
| 973907 | 9/1975 | Canada | 280/5.28 |
| 1455429 | 10/1967 | France | 280/5.2 |

*Primary Examiner*—Edward L. Roberts
*Attorney, Agent, or Firm*—Vickers, Daniels & Young

[57] ABSTRACT

A wheeled load carrier is disclosed in conjunction with a portable, drum-type motor driven drain cleaning machine, and the carrier comprises a wheeled frame structure on which the drum and drive motor are mounted and which is provided with wheels for transporting the drain cleaning machine along an underlying surface. The frame is provided with a pair of endless belt-type slide assemblies pivotally mounted thereon for displacement between first and second positions in which the belts respectively facilitate displacement of the drum cleaning machine upwardly and downwardly along a stairway and upwardly and downwardly relative to and along a truckbed or loading platform to facilitate loading and unloading of the drain cleaning machine relative thereto.

41 Claims, 6 Drawing Sheets

WHEELED LOAD CARRIER

BACKGROUND OF THE INVENTION

This invention relates to the art of wheeled load carriers and, more particularly, to improvements in wheeled load carriers which are provided with devices to facilitate displacement of the carrier upwardly and downwardly relative to a stairway.

The present invention finds particular utility and accordingly is described herein in conjunction with a portable, motor driven, drum-type drain cleaning machine. At the same time, it will be appreciated that the invention is applicable to any load carrier of the character having wheels for transporting a load along an underlying surface and with respect to which carrier it is desirable to facilitate the displacement thereof, with or without a load thereon, upwardly and downwardly relative to a horizontal edge elevated from the underlying surface.

It is of course well known to provide wheeled dollies, carts, hand trucks, portable machine supporting frames and the like with slide arrangements which facilitate sliding movement of the carrier upwardly and downwardly along a stairway. Such slide arrangements are disclosed, for example, in U.S. Pat. No. 5,087,013 to Gress et al wherein a foldable stand for a threading machine is provided with ridged skid bars, in U.S. Pat. No. 1,255,484 to Stephens wherein a portion of the frame of a wheeled truck for transporting garbage cans provides rigid skid bars, in U.S. Pat. No. 4,632,627 to Swallows wherein the underside of a wheeled loader, transport and work table cart is provided with glide bars, and in U.S. Pat. Nos. 4,364,139 to Babb et al and 5,031,276 to Babb et al wherein the supporting frame structure for a portable drum-type sewer cleaning machine is provided with skid strips. In each of the foregoing patents, the slide arrangement is defined by rigid skids or runners forming part of or fixed to the carrier. It is also known to provide such carriers with slide arrangements which are rotatably displaceable relative to the carrier as shown, for example, in U.S. Pat. No. 3,007,186 to Olsson wherein the supporting frame structure for a sewer cleaning machine is provided with a staggered wheel arrangement to facilitate displacement of the machine upwardly and downwardly along a stairway, and U.S. Pat. Nos. 3,246,354 to Cooney et al and 3,747,153 to O'Neill wherein the supporting frame for a portable sewer cleaning machine is provided with a belt-type slide arrangement in which a pair of endless belts are trained about and displaceable relative to corresponding underlying belt support members.

Slide arrangements of the foregoing character serve their intended purpose of making it easier to move a wheeled carrier and its load upwardly and downwardly relative to a stairway, but considerable difficulty is attendant to efforts of a workman to elevate or lower the carrier and load relative to a horizontal surface having an elevation greater than that of a riser of a stairway, such as a loading platform or the bed of a truck, for example. In this respect, the carrier must be positioned adjacent the horizontal edge of the platform or truck bed and then elevated and pivoted about the horizontal edge and pushed onto the horizontal surface against the resistance resulting from frictional engagement between the horizontal surface and the loaded carrier, whereby sliding of the carrier and load onto the horizontal surface is difficult to say the least, even when the slide arrangement is provided by rotatable belts or wheels as in the patents to Conney et al, O'Neill and Olson. Considering the fact that the load on the carrier can be 200 pounds or more, it will be appreciated that such loading and unloading of the carrier relative to an elevated horizontal surface can require the effort of two workmen and still require considerable physical effort on the part of the workmen to achieve the loading or unloading operation. In connection with portable sewer cleaning apparatus, it is not uncommon for a single workman to have to achieve such loading and unloading alone, and it will be appreciated that the physical effort required not only subjects the workman to potential injury through muscle strain but also through the difficulty in achieving the loading or unloading of the carrier and load without the latter slipping from the workman's hands and thus subjecting the workman to physical injury.

One effort to overcome the difficulty of loading and unloading portable drain cleaning apparatus relative to an elevated horizontal surface is disclosed in the aforementioned patent to Cooney et al wherein a wheel is provided at the upper end of the handle of the carrier. The wheel is adapted, upon pivoting of the loaded carrier about the horizontal edge of the elevated surface to engage the latter and allow the workman to elevate the lower end of the carrier relative to the horizontal surface in the manner of a wheelbarrow and then move the loaded carrier further onto the horizontal surface. A principal disadvantage of this arrangement is the instability of the loaded carrier during movement onto the horizontal surface resulting from the single wheel and the tendency of the carrier to pivot in opposite directions laterally thereof. Furthermore, the location of the wheel on the upper end of the handle interferes with a workman's grasping of the handle for rolling transport of the carrier and load along an underlying surface, and the wheel must be removed from the handle to avoid such interference.

SUMMARY OF THE INVENTION

In accordance with the present invention, a wheeled carrier for transporting loads along an underlying surface is provided with an improved slide arrangement which, in addition to facilitating movement of a loaded carrier upwardly and downwardly relative to a stairway, enables a single workman to load and unload the carrier relative to an elevated horizontal surface with considerable ease and stability. Furthermore, a slide arrangement provided in accordance with the present invention does not interfere whatsoever with a workman's transporting the wheeled carrier along an underlying surface and does not need to be removed from the carrier to avoid such interference. More particularly, in accordance with the invention, a wheeled carrier is provided with a slide arrangement mounted on the carrier for displacement relative thereto between first and second positions in which the carrier is respectively positioned to facilitate displacement of the carrier along a stairway and upwardly and downwardly about the horizontal edge of an elevated surface such as a loading platform or truck bed. In the second position of the slide arrangement, the carrier is adapted to be moved along the horizontal surface without tilting or pivoting transverse to the direction of movement onto the horizontal surface. Thus, a single workman can easily load and/or unload the carrier and the load thereon relative to such a horizontal surface with less physical effort then heretofore required and with improved safety with respect to potential injury.

Preferably, the slide arrangement is pivotally mounted on the carrier and, in the first position thereof, is disposed adjacent the carrier and the carrier wheels to facilitate displacement of the carrier and a load thereon upwardly and downwardly relative to a stairway. In the second position, the slide extends outwardly from the carrier and upwardly at an angle to horizontal and is at an elevation from the underlying support surface which positions the slide surfaces for engagement with the horizontal edge of a loading platform or truck bed. In this position, the slide has an outer end spaced from the carrier and, upon displacement of the carrier upwardly and about the platform or truck bed edge, during loading relative thereto, the outer end is adapted to engage the horizontal platform or truck bed to support the carrier for movement thereonto with stability against tilting or pivoting laterally of the direction of movement. Similarly, the outer end facilitates stabilized movement of the carrier relative to a truck bed or platform during an unloading operation. Preferably, the slide arrangement comprises a pair of slide members horizontally spaced apart, whereby the outer ends of the two slide members engage the platform or truck bed to stabilize the carrier against tilting movement. In accordance with a preferred embodiment, the two slide members are comprised of endless belts which not only facilitate displacement of the carrier upwardly and downwardly relative to the elevated horizontal edge but also provide for rolling displacement of the carrier relative to a loading platform or truck bed with both stability and minimum physical effort on the part of a workman.

It is accordingly an outstanding object of the present invention to provided an improved load carrier of the character having wheels supporting the carrier for rolling movement on an underlying surface and a slide arrangement for supporting the carrier for sliding movement relative to horizontal edges elevated from the underlying surface.

Another object is the provision of a carrier of the forgoing character with a slide arrangement mounted on the carrier for displacement relative thereto between first and second positions in which the slide arrangement respectively supports the carrier for sliding displacement relative to a first horizontal edge elevated a first distance from the underlying surface and a second horizontal edge elevated from the underlying surface a distance greater than the first distance.

Yet another object is the provision of a carrier of the foregoing character with a slide arrangement which facilitates the ease of loading and unloading the carrier relative to a horizontal surface in a plane through the second horizontal edge and stabilizes the carrier during such loading and unloading operation.

Yet another object is the provision of a carrier of the foregoing character with a slide arrangement pivotally mounted thereon for displacement between a first position adjacent the carrier and the wheels thereof to facilitate displacement of the carrier upwardly and downwardly relative to a stairway and a second position extending outwardly and upwardly relative to the carrier for engaging the horizontal edge of an elevated surface to facilitate loading and unloading of the carrier relative to the elevated surface.

Yet a further object is the provision of a carrier of the foregoing character in which the slide arrangement in the second position thereof has an outer end which supports the carrier for displacement along the horizontal surface and stabilizes the carrier during such displacement against tilting transverse to the direction of movement.

Still a further object is the provision of a portable sewer cleaning machine including a wheeled carrier supporting the machine for rolling movement on an underlying surface and a slide arrangement on the carrier for supporting the machine for movement upwardly and downwardly relative to a stairway and for supporting the machine for loading and unloading displacement relative to a horizontal surface such as that provided by a truck bed or loading platform.

Still a further object is the provision of a sewer cleaning machine of the foregoing character wherein the slide arrangement provides stability against tilting of the machine transverse to the direction of movement thereof relative to the horizontal surface during loading and unloading of the machine therefrom.

Still a further object is the provision of a load carrier with a slide arrangement comprising a pair of endless belts pivotally mounted on the carrier for displacement between a stair climbing position relative to the carrier and a position in which the belts are oriented relative to the carrier to facilitate loading and unloading the carrier relative to a horizontal surface such as that provided by a truck bed or loading platform and in which orientation the belts have ends supporting the carrier for displacement along the underlying surface with stability against pivotal displacement of the carrier laterally of the direction of movement.

BRIEF DESCRIPTION OF THE DRAWINGS

The foregoing objects, and others, will in part be obvious and in part be pointed more fully hereinafter in conjunction with the written description of a preferred embodiment of the invention illustrated in the accompanying drawings in which.

DESCRIPTION OF A PREFERRED EMBODIMENT

Figure 1:
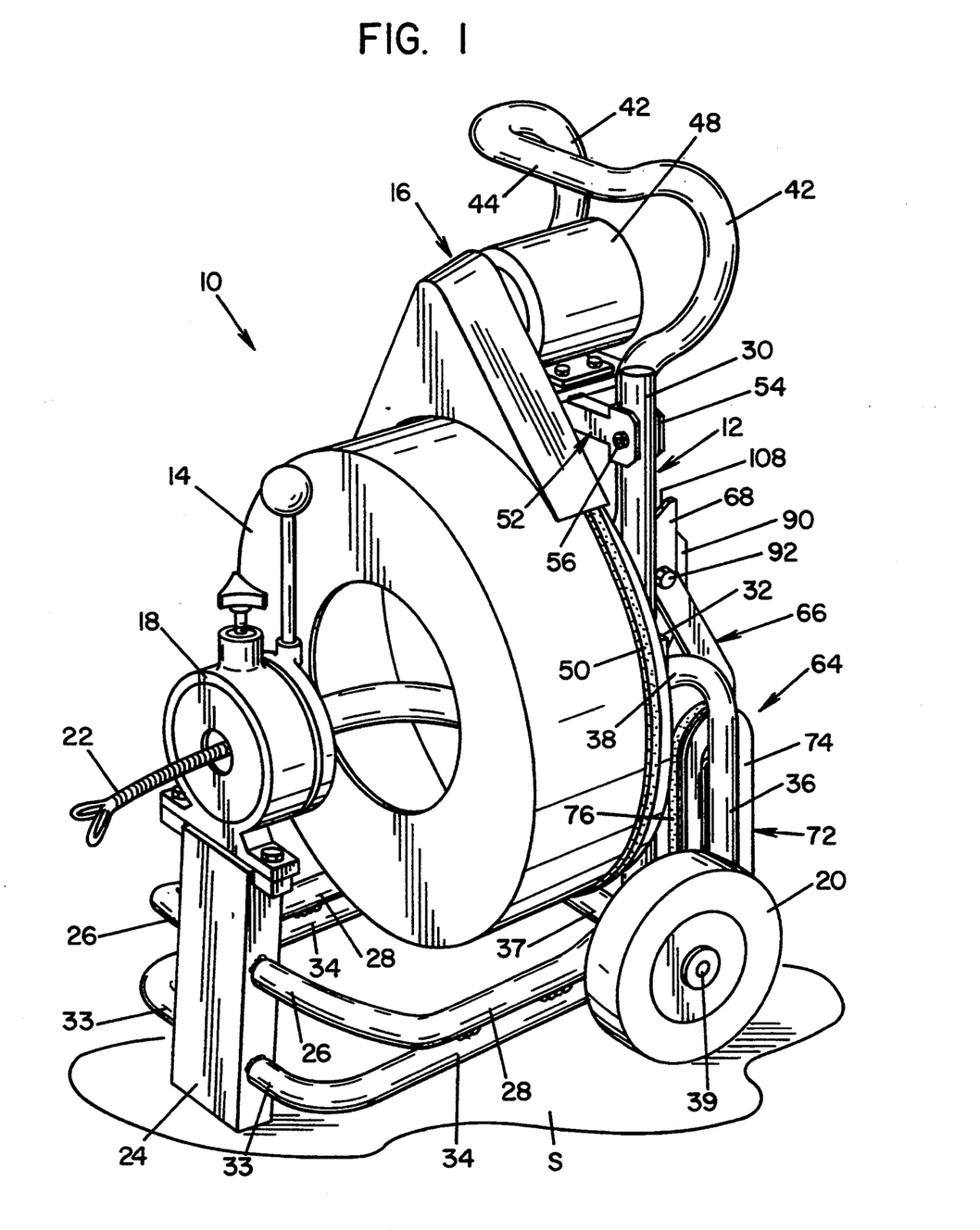
FIG. 1 is a perspective view of a drum-type motor driven drain cleaning machine mounted on a wheeled frame structure including a slide arrangement in accordance with the present invention.

Referring now in greater detail to the drawings wherein the showings are for the purpose of illustrating a preferred embodiment of the invention only and not for the purpose of limiting the invention, a portable sewer or drain cleaning machine 10 is shown in FIG. 1 as comprising a wheeled frame assembly 12 supporting a rotatable snake drum unit 14, a drum driving arrangement 16, and a snake feeding mechanism 18. Frame assembly 12, which is shown in greater detail in FIGS. 2 and 3 of drawing, is provided with a pair of wheels 20 by which machine 10 is adapted to be supported for rolling movement from one location to another along an underlying surface S. As is well known in connection with drain cleaning machines of the character disclosed, drum unit 14 contains a flexible plumbers snake 22 which extends outwardly through feed mechanism 18 and which is adapted to be rotated and displaced inwardly and outwardly relative to the drum unit during operation of the machine.

Frame assembly 12 is basically of tubular construction and includes a tubular, box-like front support member 24 upon which feed mechanism 18 is mounted, and tubular upper frame members having legs 26 extending laterally outwardly from opposite sides of support member 24 and corresponding rearwardly extending legs 28 which terminate in upwardly extending legs 30. Legs 30 extend upwardly through openings therefor in a rear support member 32 and are secured thereto such as by welding. The frame assembly further includes a bottom frame member having legs 33 extending laterally from opposite sides of front support member 24, corresponding legs 34 which extend rearwardly beyond the corresponding leg 28 of the upper frame member and thence upwardly to provide legs 36 which terminate in forwardly extending legs 38 which are secured to rear support member 32 such as by welding. A tubular axle support 37 extends between frame legs 36 and is suitably secured thereto such as by welding, and a wheel axle 39 extends through tube 37 and through openings therefor in frame members 36 to receive wheels 20. The frame assembly further includes a tubular handle comprising upwardly extending legs 40 interconnected at the upper ends thereof by a handle gripping portion including U-shaped portions 42 extending rearwardly and then forwardly of legs 40 and a generally horizontal U-shaped connecting portion 44 between portions 42. The lower ends of legs 40 of the handle extend through aligned openings therefor, not designated numerically, provided in the upper and lower ends of rear support 32, and the handle is vertically adjustable relative to support member 32 by means of a pair of knobs 46 on the outer ends of threaded shanks, not shown, which extend through support member 32 for engagement with the corresponding one of the legs 40. Drum assembly 14 is rotatably supported on rear support member 32 in a manner similar to that disclosed in the aforementioned U.S. Pat. No. 5,031,276 to Babb et al, whereby reference may be had to the later patent for details in this respect. At the same time, however, neither the structure of the drum assembly nor the details regarding the mounting and driving thereof form part of the present invention, whereby it will be appreciated that other drum structures as well as mounting and drive arrangements can readily be employed. In the embodiment illustrated, the drum assembly is driven by an electric drive motor 48 of drive unit 16 through an endless belt 50 which engages about the outer periphery of the drum housing. Further, in a manner similar to that disclosed in the latter Babb et al patent, motor 48 is pivotally supported on frame assembly 12 by a support member 52 having a laterally outwardly open U-shaped bracket 54 thereon which receives the corresponding leg 30 of the frame assembly and is pivotally secured thereto by a nut and bolt assembly 56. The opposite end of support member 52 is provided with a laterally outwardly open U-shaped bracket 58 which receives the corresponding leg member 30 of the frame assembly and which is provided with a laterally outwardly extending handle 60 by which the motor support assembly is adapted to be pivoted about the axis provided by nut and bolt assembly 56. A coiled compression spring 62 surrounds leg 30 between the lower end of bracket 58 and the upper side of rear support member 32 to bias the drive unit upwardly relative to the drum assembly so as to tension drive belt 50.

Figure 2:
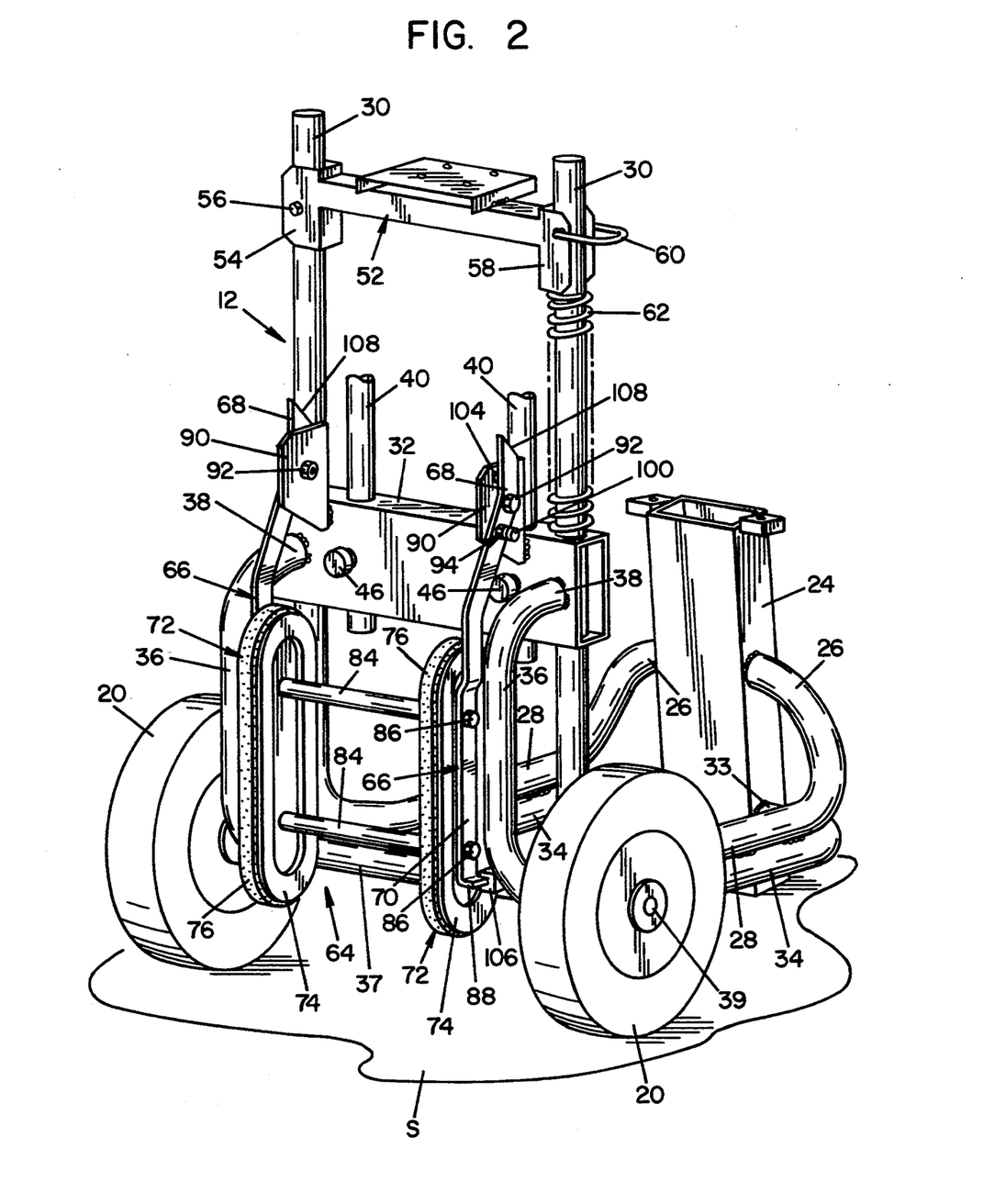
FIG. 2 is a rear perspective view of the frame structure showing the slide arrangement positioned for climbing stairs.
Figure 3:
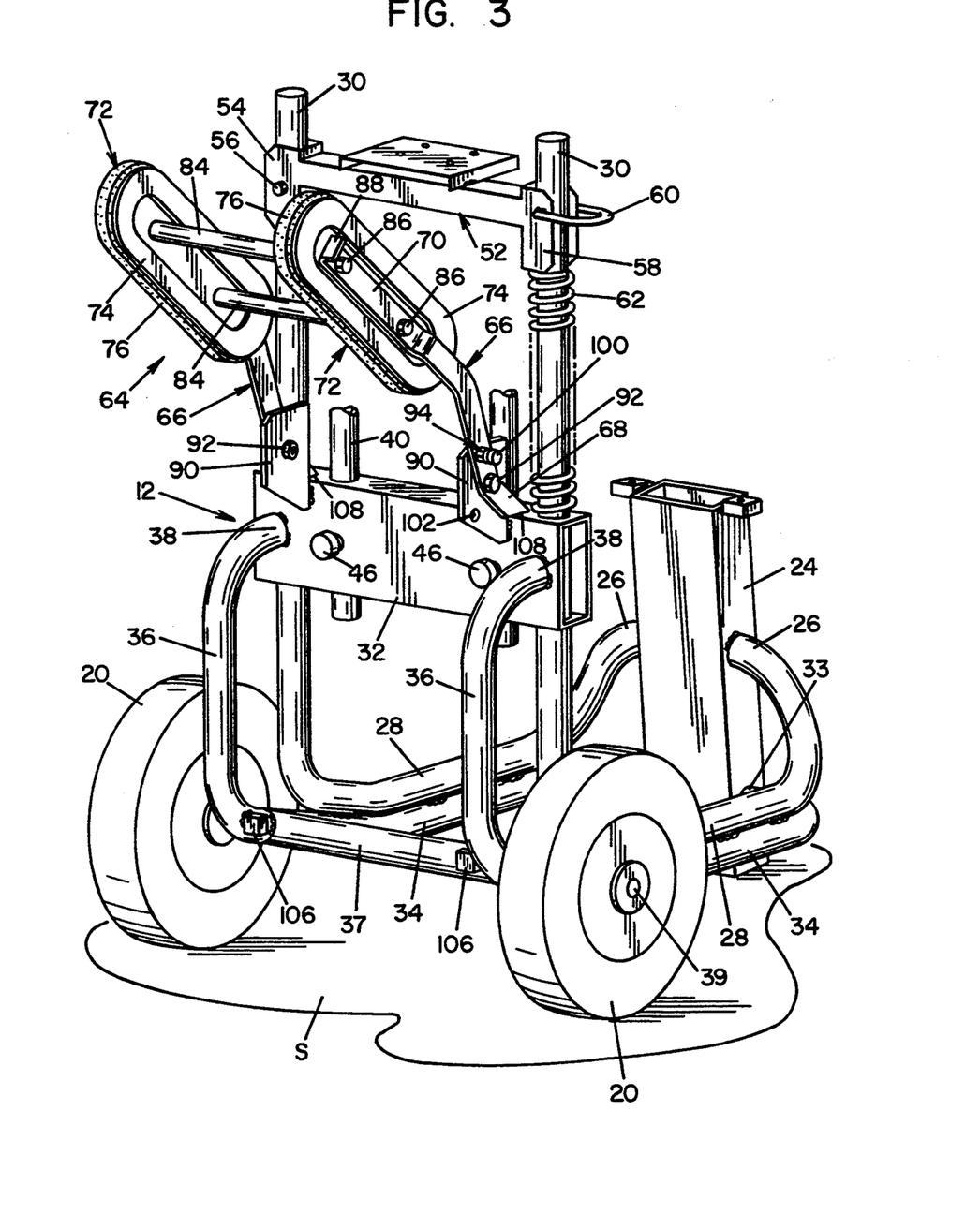
FIG. 3 is a rear perspective view of the frame structure showing the slide arrangement positioned for loading onto an elevated platform.
Figure 4:
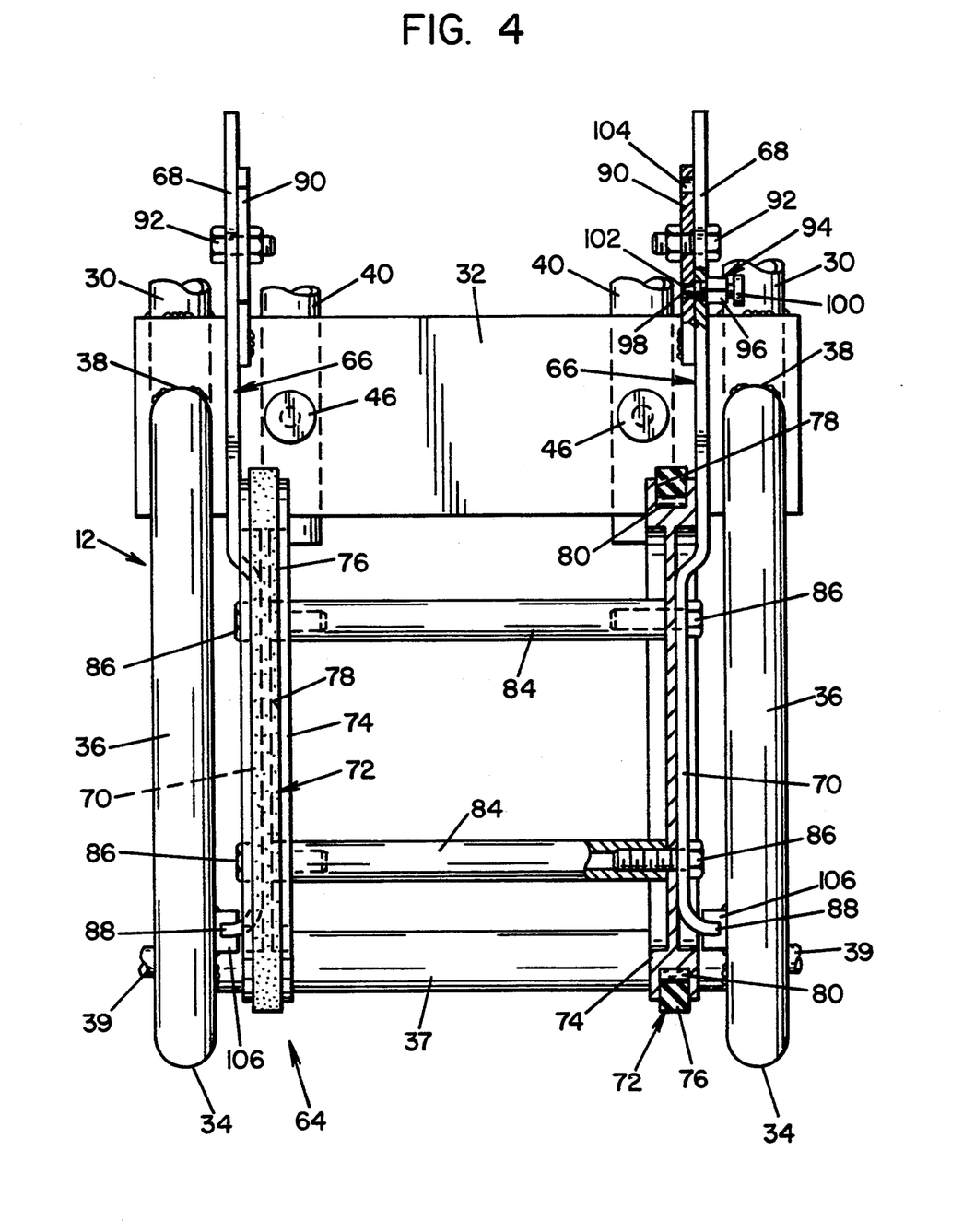
FIG. 4 is an elevation view, partially in section of the slide assembly.

In accordance with the present invention, frame assembly 12 is provided with a slide arrangement 64 mounted thereon for displacement between a first position shown in FIG. 2 and a second position shown in FIG. 3 and in which the slide arrangement respectively facilitates displacement of the frame assembly and drain cleaning machine thereon upwardly and downwardly relative to a stairway and upwardly and downwardly relative to an elevated horizontal surface such as a loading platform or the bed of a truck. In the preferred embodiment, as best seen in FIGS. 2-4, slide arrangement 64 comprises an arm assembly including a pair of arm members 66 having inner ends 68 pivotally interconnected with frame assembly 12 as set forth hereinafter and outer ends 70 which are provided with corresponding endless belt-type slide assemblies 72. As is well known, the latter comprise belt support members 74 which carry endless belts 76 in belt receiving recesses 78 extending about the periphery thereof and the bottoms of which recesses are provided with rollers 80 to enhance rotation of belts 76 in the grooves under the weight of a load thereon. The arm assembly further includes a pair of tubular cross members 84 extending between belt support members 74, and outer ends 70 of arms 66, support members 74 and cross members 84 are interconnected by threaded bolts 86. The outer most ends of arms 66 terminate in laterally outwardly extending legs 88 which serve the purpose set forth hereinafter.

As will be appreciated from FIGS. 2 and 3 of the drawing and the foregoing description, each of the belt support members 74 has inner and outer ends relative to the corresponding arm member 66 and the inner end of which is spaced outwardly from the pivot axis defined by nut and bolt assemblies 92. It will be further appreciated that each of the belt support members is elongated in the direction of the corresponding arm member 66 and that the inner and outer ends of the support members are semi-circular, thus providing for each of the endless belts 76 at any given time to have inner and outer ends and parallel belt runs between the ends. As will be further appreciated from FIGS. 2 and 3 of the drawing, when slide assembly 64 is in the first position it extends downwardly from the pivot axis defined by nut and bolt assemblies 92 and is positioned between frame legs 36 in a generally vertical disposition parallel to frame legs 30. When slide assembly 64 is in the second position, as shown in FIG. 3, it extends upwardly and outwardly of the frame assembly at an angle to a horizontal plane through the axis defined by nut and bolt assemblies 92. In both the first and second positions of the slide assembly, endless belts 76 provide slide surfaces which facilitate displacement of the frame assembly as described more fully hereinafter relative to a stairway or to an elevated horizontal surface such as a loading platform or truck bed.

Rear support member 32 of frame assembly 12 is provided with a pair of mounting brackets 90, secured thereto such as by welding, and inner ends 68 of arms 66 are pivotally secured to mounting brackets 90 by corresponding nut and bolt assemblies 92. Accordingly, it will be appreciated that slide assembly 64 is supported on the frame assembly for pivotal displacement about a horizontal axis defined by nut and bolt assemblies 92 and which axis is parallel to and spaced above the wheel axis as defined by axle 39. As mentioned hereinabove, the slide assembly is pivotal reactive to frame assembly 12 between a first position shown in FIG. 2 and a second position shown in FIG. 3, and the slide assembly and frame assembly are adapted to be releasably interengaged in each of the two positions. More particularly in this respect, one of the arms 66 is provided with a spring-biased retaining pin unit 94 which, in a well known manner, includes a pin or plunger housing 96 threadedly supported in an opening therefor through leg 66, and a pin 98 biased inwardly of leg 66 and the corresponding mounting bracket 90 by a spring in housing 96. Pin 98 has an outer end provided with a knob 100 by which the pin can be withdrawn outwardly relative to mounting bracket 90 and arm 66 against the spring bias and, in the embodiment illustrated, mounting bracket 90 has a lower hole 102 and an upper hole 104 corresponding to the first and second positions of the slide assembly respectively. Accordingly, it will be appreciated that when the slide assembly is in the first position shown in FIG. 2, pin 98 extends into opening 102 to releasably hold the slide assembly against displacement relative to the frame assembly and, upon pulling pin 98 laterally outwardly relative to bracket 90 and arm 66, the slide assembly can be pivoted to the second position in which pin 98 engages in opening 104 to releasably hold the slide assembly in the second position. The laterally inner sides of frame legs 36 are each provided with an abutment block 106 which, as best seen in FIG. 4, is positioned to engage leg 88 on the outer end of the corresponding one of the arm members 66 when the slide assembly is in the first position shown in FIG. 2. Blocks 106 and legs 88 interengage to distribute the load applied to the slide assembly during use and to preclude imposing load forces on retainer pin unit 94. For the same purpose, the innermost end of each arm 66 is provided with an abutment edge 108 which is adapted to engage against the upper side of rear support member 32 of the frame assembly when slide assembly 64 is in the second position shown in FIG. 3.

Figure 5A:
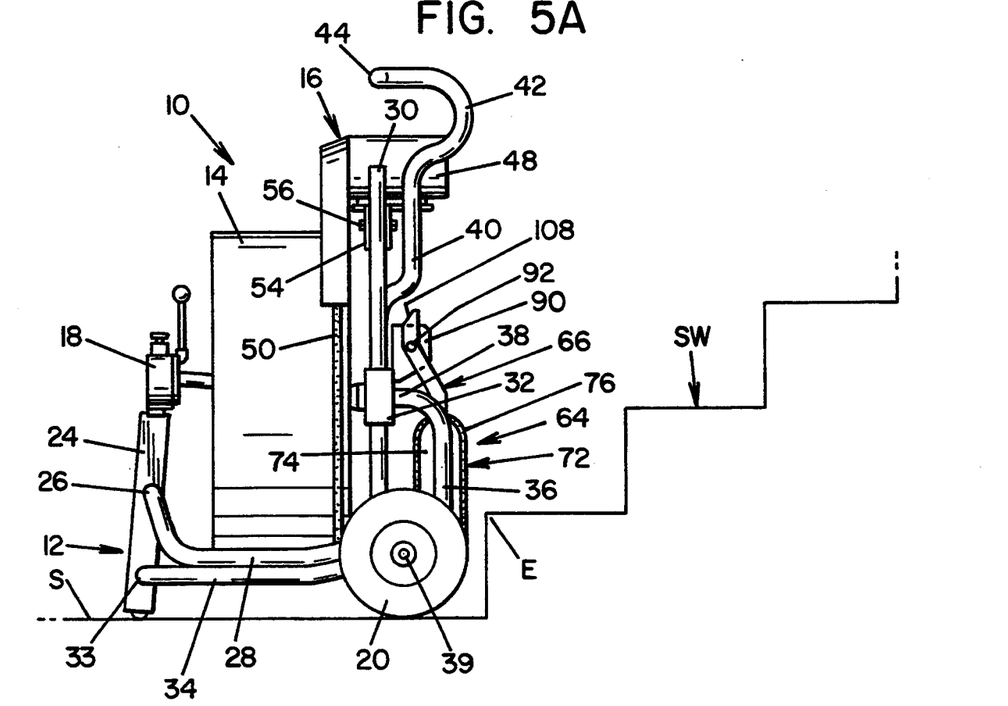
FIGS. 5A and 5B schematically illustrate the frame structure and slide arrangement in connection with movement relative to a stairway.
Figure 5B:
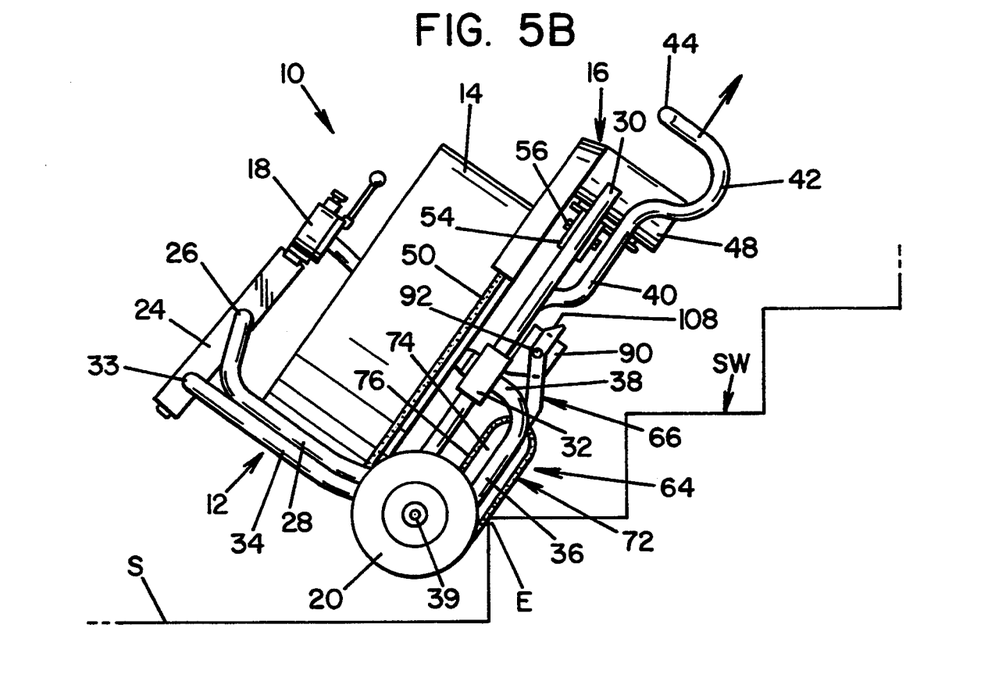
Figure 6A:
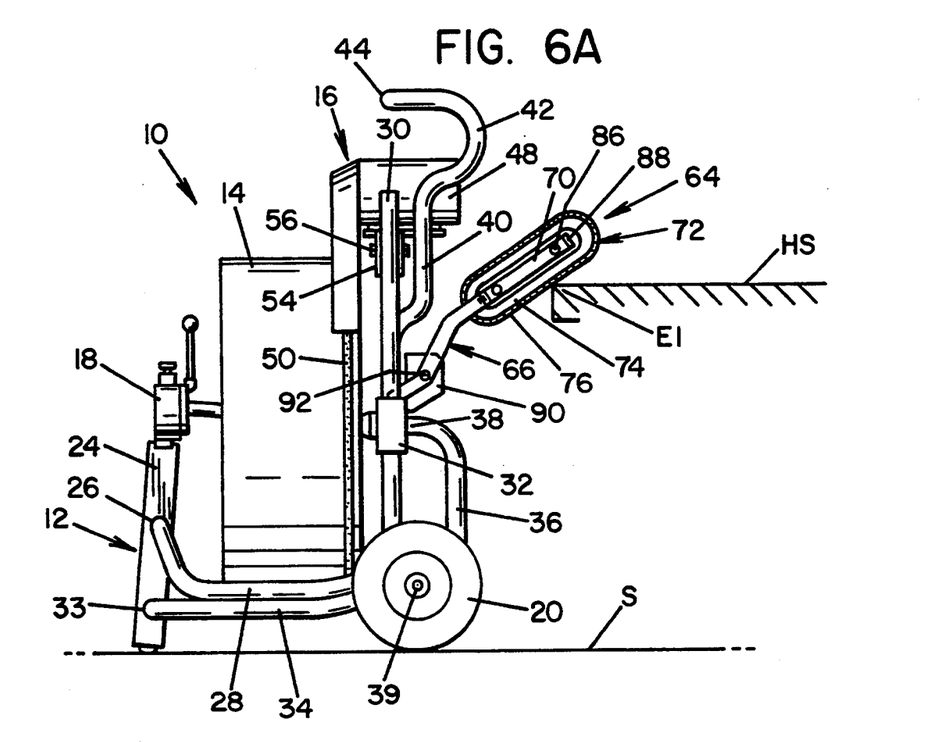
FIGS. 6A and 6B schematically illustrate the frame structure and slide arrangement in connection with loading thereof onto an elevated surface.
Figure 6B:
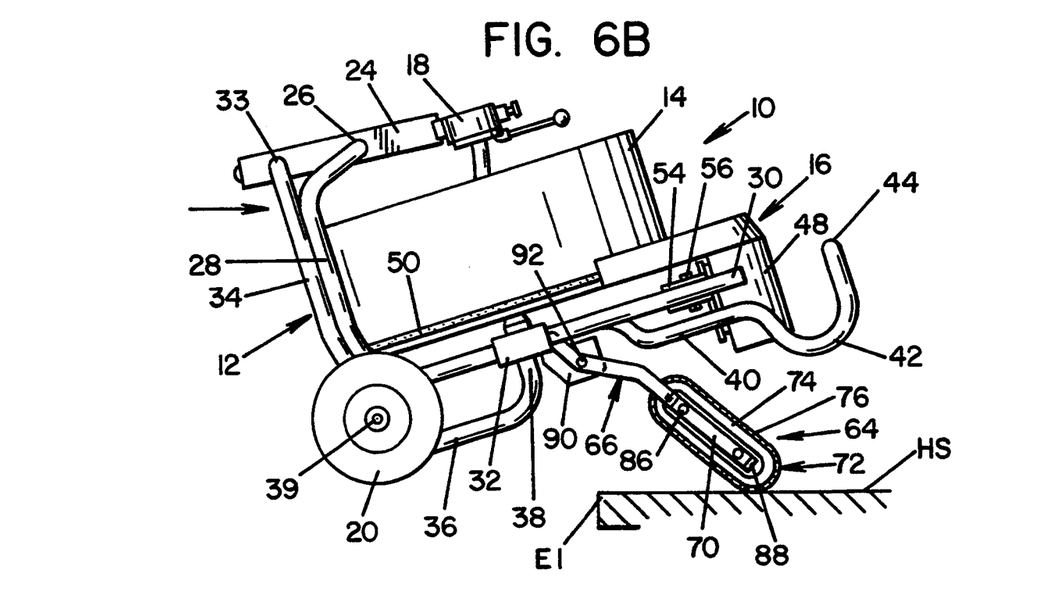

It is believed that the operation of slide assembly 64 in connection with transporting frame assembly 12 relative to a stairway and relative to an elevated horizontal surface such as a loading platform or truck bed will be understood from the following description with reference to FIGS. 5 and 6 of the drawing. With reference first to FIG. 5A, frame assembly 12 is illustrated as being supported on underlying surface S adjacent the lowermost riser of a stairway SW and which lowermost riser provides a horizontal edge E elevated from surface S. Slide assembly 64 is in the first position thereof relative to frame assembly 12 and in which endless belts 76 are positioned to engage edge E. When the frame assembly is so located, a workman can grasp handle portion 44 and pivot the frame assembly clockwise in FIG. 5A to the position shown in FIG. 5B and in which position endless belts 76 facilitate moving frame assembly 12 upwardly or downwardly relative to successive stair risers.

In FIG. 6A, slide assembly 64 is shown in the second position thereof relative to frame assembly 12, and the frame assembly is positioned adjacent an elevated horizontal edge E1 which is elevated from underlying surface S a greater distance than that of stair riser edge E and which, for example, is the edge of a loading platform, truck bed or other horizontal surface HS in a plane through edge E1. When slide assembly 64 is in the second position, belt 76 is positioned to engage edge E1 and a workman can then grasp one of the frame portions 26 and 33 and elevate the frame assembly and a load thereon upwardly relative to edge E1 and, at the same time, pivot the frame assembly clockwise for the belts to ride along horizontal surface HS. The operator can then further pivot the frame assembly clockwise to the position shown in FIG. 6B to facilitate moving the frame assembly and the load thereon further onto surface HS, finally completing such movement by engaging wheels 20 with the horizontal surface whereupon the frame assembly is supported by both wheels 20 and the belts of the slide assembly.

As will be appreciated from the foregoing description, the provision of laterally spaced apart belts provides stability during such a loading operation against tipping or pivoting of the frame assembly and a load thereon laterally with respect to the direction of movement of the frame assembly relative to surface HS. It will be further appreciated that unloading of the frame assembly and a load thereon relative to surface HS is achieved by reversing the foregoing displacement of the frame assembly relative to the horizontal surface. When the unloading operation has been completed, slide assembly 64 can be returned to its first position to facilitate transportation of the frame assembly and load from one location to another along underlying surface S on wheels 20.

While considerable emphasis has been placed herein on the structure of the frame assembly and slide assembly of the disclosed embodiment of the invention, and the structural interrelationship between the frame assembly and slide assembly, it will be readily appreciated that many embodiments of the invention can be made and that many changes can be made in the embodiment herein illustrated and described without departing from the principles of the invention. In particular in this respect, it is obvious that any wheeled load carrier in the form of a dolly, cart, hand truck, or the like having a frame structure for transporting loads along an underlying surface can be provided with a slide arrangement displaceable between first and second positions relative to the frame structure to facilitate displacement of the carrier with or without a load thereon upwardly and downwardly relative to a stairway and to an elevated horizontal surface such as a loading platform or truck bed. Furthermore, it will be appreciated that while it is preferred to use endless belts to provide the slide surfaces of the slide assembly, the slide surfaces could be provided by linear runners or skids having curved outer ends to facilitate sliding movement of the carrier along an elevated horizontal surface in the manner described hereinabove in connection with FIG. 6B. Alternatively, the outer ends of linear runners or skids could be provided with roller elements for the latter purpose. It will be further appreciated that arm structures and arrangements for pivotally mounting the slide assembly on a carrier frame, other then those herein illustrated and described, can readily be devised as can other arrangements for releasably holding the slide assembly in its two positions relative to the frame structure. In particular with regard to the latter, it will be understood that the arm assembly can be slidably interengaged with the frame assembly, such as through the use of brackets slidably receiving the inner ends of arms 66, and removable therefrom for repositioning between the two use positions. These and other modifications of the embodiment herein disclosed as well as other embodiments of the invention will be obvious and suggested to those skilled in the art upon reading the present disclosure, whereby it is to be distinctly understood that the foregoing descriptive matter is to be interpreted merely as illustrative of the present invention and not as a limitation.

Having thus described the invention it is claimed:

1. In a sewer cleaning machine comprising frame means, snake drum means supported on said frame means for rotation about a drum axis, means for rotating said drum means, wheel means for supporting said machine for rolling movement on an underlying surface, and slide means on said frame means for supporting said machine for sliding movement relative to horizontal edge means elevated from said surface, the improvement comprising: said slide means being mounted on said frame means for displacement relative thereto between a first position in which said slide means is positioned to engage first horizontal edge means elevated a first distance from said underlying surface and a second position in which said slide means is positioned to engage second horizontal edge means elevated from said underlying surface a distance greater than said first distance.

2. A sewer cleaning machine according to claim 1, wherein said slide means is mounted on said frame means for pivotal displacement between said first and second positions.

3. A sewer cleaning machine according to claim 1, and means for releasably holding said slide means in each of said first and second positions.

4. A sewer cleaning machine according to claim 1, wherein said slide means includes means for engaging a horizontal surface in a plane through said second edge means and supporting said machine for movement along said horizontal surface.

5. A sewer cleaning machine according to claim 1, wherein said slide means has opposite ends, and means mounting said slide means on said frame means for pivotal movement about a horizontal axis adjacent one of said opposite ends of said slide means.

6. A sewer cleaning machine according to claim 5, and means for releasably holding said slide means in each of said first and second positions.

7. A sewer cleaning machine according to claim 6, wherein said slide means and said frame means include means interengaging to limit pivotal displacement of said slide means in the direction toward each said first and second position.

8. A sewer cleaning machine according to claim 6, wherein the other of said opposite ends of said slide means in said second position is adapted to engage a horizontal surface in a plane through said Second horizontal edge and support said machine for movement along said horizontal surface.

9. A sewer cleaning machine according to claim 1, wherein said slide means includes endless belt means and belt support means supporting said belt means for rotation relative to said frame means.

10. A sewer cleaning machine according to claim 9, wherein said slide means includes arm means mounting said belt support means on said frame means for pivotal movement about a horizontal axis between said first and second positions of said slide means.

11. A sewer cleaning machine according to claim 10, wherein said frame means includes frame member means extending upwardly relative to said underlying surface, and means pivotally mounting said arm means on said frame member means.

12. A sewer cleaning machine according to claim 11, wherein said belt means has opposite ends and parallel runs between said ends, said runs in said first position of said slide means being generally parallel to said frame member means and in said second position being at an angle to said frame member means.

13. A sewer cleaning machine according to claim 12, wherein one of said opposite ends of said belt means in said second position of said slide means is adapted to engage a horizontal surface in a plane through said second horizontal edge and support said machine for displacement along said horizontal surface.

14. A sewer cleaning machine according to claim 13, and means releasably interengaging said arm means and said frame member means in each of said first and second positions of said slide means.

15. A sewer cleaning machine according to claim 14, wherein said slide means and said frame means include means interengaging to limit pivotal displacement of said slide means in the direction toward each said first and second position.

16. A sewer cleaning machine according to claim 11, wherein said frame member means has a lower end relative to said underlying surface and said wheel means is on said lower end.

17. A sewer cleaning machine according to claim 16, wherein said wheel means includes a pair of spaced apart wheels and said belt means includes a pair of spaced apart belt supports on said arm means and an endless belt on each said belt support.

18. A sewer cleaning machine according to claim 17, wherein one of said opposite ends of said belt means in said second position of said slide means is adapted to engage a horizontal surface in a plane through said second horizontal edge and support said machine for displacement along said horizontal surface.

19. A sewer cleaning machine according to claim 18, and means releasably interengaging said arm means and said frame member means in each of said first and second position of said slide means.

20. A sewer cleaning machine according to claim 19, wherein said slide means and said frame means include means interengaging to limit pivotal displacement of said slide means in the direction toward each said first and second position.

21. A carrier for transporting a load comprising, frame means, wheel means supporting said frame means for rolling movement along an underlying surface, slide means on said frame means for supporting said frame means for sliding movement relative to horizontal edge means elevated from said surface, and arm means mounting said slide means on said frame means, means for mounting said arm means in first and second positions relative to said frame means, said first and second positions of said slide means being angularly spaced apart by an obtuse angle, said slide means in said first position being positioned to engage first horizontal edge means elevated a first distance from said underlying surface, and said slide means in said second position being positioned to engage second horizontal edge means elevated from said underlying surface a distance greater than said first distance.

22. A carrier according to claim 21, and means for releasably holding said slide means in each of said first and second positions.

23. A carrier according to claim 21, wherein said slide means has opposite ends and slide surface means therebetween, said slide surface means in said first position of said slide means extending generally vertically and in said second position extending away from said frame means at an angle to vertical.

24. A carrier according to claim 23, wherein said slide surface means of said slide means extends upwardly and outwardly relative to said frame means in said second position.

25. A carrier according to claim 24 wherein one of said opposite ends of said slide means in said second position of said slide means is adapted to engage a horizontal surface in a plane through said second horizontal edge and support said carrier for displacement along said horizontal surface.

26. A carrier according to claim 23, wherein said means mounting said slide means on said frame means includes means supporting said slide means on said frame means for said opposite ends of said slide means to be pivotal between said first and second positions of said slide means about a horizontal pivotal axis.

27. A carrier according to claim 26, and means for releasably holding said slide means in each of said first and second positions.

28. A carrier according to claim 26, wherein said slide means includes endless belt means and means supporting said belt means for rotation relative to said frame means.

29. A carrier according to claim 28, wherein said belt means includes end means for engaging a horizontal surface in a plane through said second edge means and supporting said carrier for displacement along said horizontal surface.

30. A carrier according to claim 28, wherein said arm means includes first end means pivotally attached to said frame means at said pivot axis and second end means spaced from said pivot axis, said means supporting said belt means being mounted on said arm means for displacement therewith.

31. A carrier according to claim 30, wherein said wheel means is rotatable about a horizontal wheel axis and said pivot axis is spaced above and parallel to said wheel axis.

32. A carrier according to claim 31, wherein said arm means and said frame means include means interengaging to limit pivotal displacement of said arm means in the direction toward each said first and second position.

33. A carrier according to claim 32, and means for releasably interengaging said arm means and said frame means in each of said first and second positions of said slide means.

34. A carrier according to claim 21, wherein said arm means is mounted on said frame means for pivotal displacement relative thereto about a horizontal pivot axis, said slide means being mounted on said arm means for displacement therewith.

35. A carrier according to claim 34, wherein said frame means includes a pair of horizontally spaced apart frame members extending upwardly relative to said underlying surface and said wheel means includes a pair of wheels each outwardly adjacent a different one of said frame members, said pair of wheels being rotatable about a horizontal wheel axis, said arm means and said slide means thereon being between said frame members, said pivot axis being spaced above said wheel axis, and said slide surface means extending downwardly of said pivot axis in said first position of said slide means and extending upwardly at an angle to a horizontal plane through said pivot axis in said second position of said slide means.

36. A carrier according to claim 35, wherein said slide means has an end spaced from said pivot axis, said end in said second position of said slide means being adapted to engage a horizontal surface in a plane through said second edge means and support said carrier for displacement along said horizontal surface.

37. A carrier for transporting a load comprising, frame means, wheel means supporting said frame means for rolling movement along an underlying surface, slide means on said frame means for supporting said frame means for sliding movement relative to horizontal edge means elevated from said surface, and means mounting said slide means on said frame means for displacement between first and second positions relative to said frame means, said slide means in said first position being positioned to engage first horizontal edge means elevated a first distance from said underlying surface, and said slide means in said second position being positioned to engage second horizontal edge means elevated from said underlying surface a distance greater than said first distance, said means mounting said slide means on said frame means including arm means mounted on said frame means for pivotal displacement relative thereto about a horizontal pivot axis, said slide means being mounted on said arm means for displacement therewith, said frame means including a pair of horizontally spaced apart frame member extending upwardly relative to said underlying surface an said wheel means including a pair of wheels each outwardly adjacent a different one of said frame members, said pair of wheels being rotatable about a horizontal wheel axis, said arm means and said slide means thereon being between said frame members, said pivot axis being spaced above said wheel axis, and said slide means extending downwardly of said pivot axis in said first position and extending upwardly at an angle to a horizontal plane through said pivot axis in said second position, said arm means having horizontally opposite sides, and said slide means including endless belt means on each of said opposite sides.

38. A carrier according to claim 37, wherein said arm means has an inner end at said pivot axis and an outer end spaced therefrom, each of said endless belt means including a belt support member mounted on the corresponding side of said arm means and having opposite ends in the direction between said inner and outer ends of said arm means, and an endless belt on said belt support.

39. A carrier according to claim 38, wherein said arm means and said frame means includes means interengaging to limit pivotal displacement of said arm means in the direction toward each said first and second position.

40. A carrier according to claim 39, and means for releasably interengaging said arm means and said frame means in each of said first and second positions of said slide means.

41. A carrier according to claim 40 wherein said belt means includes end means for engaging a horizontal surface in a plane through said second edge means and supporting said carrier for displacement along said horizontal surface.

* * * * *